Nov. 6, 1962 R. LUCIEN 3,062,235
HYDRAULIC SERVO-MOTOR DISTRIBUTOR
Filed March 24, 1959 5 Sheets-Sheet 2
FIG:2
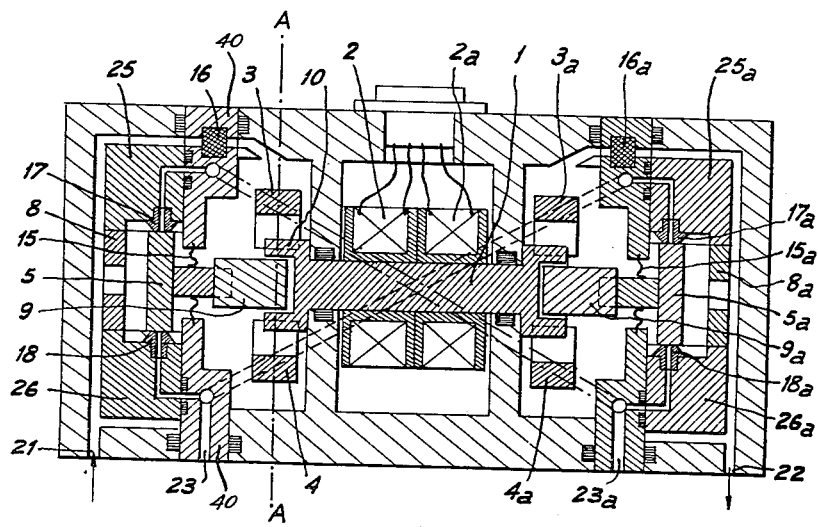
FIG:3
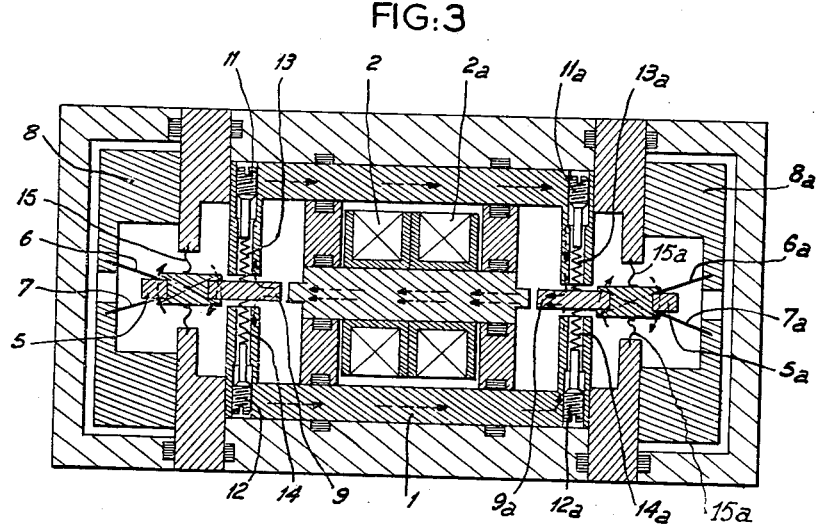

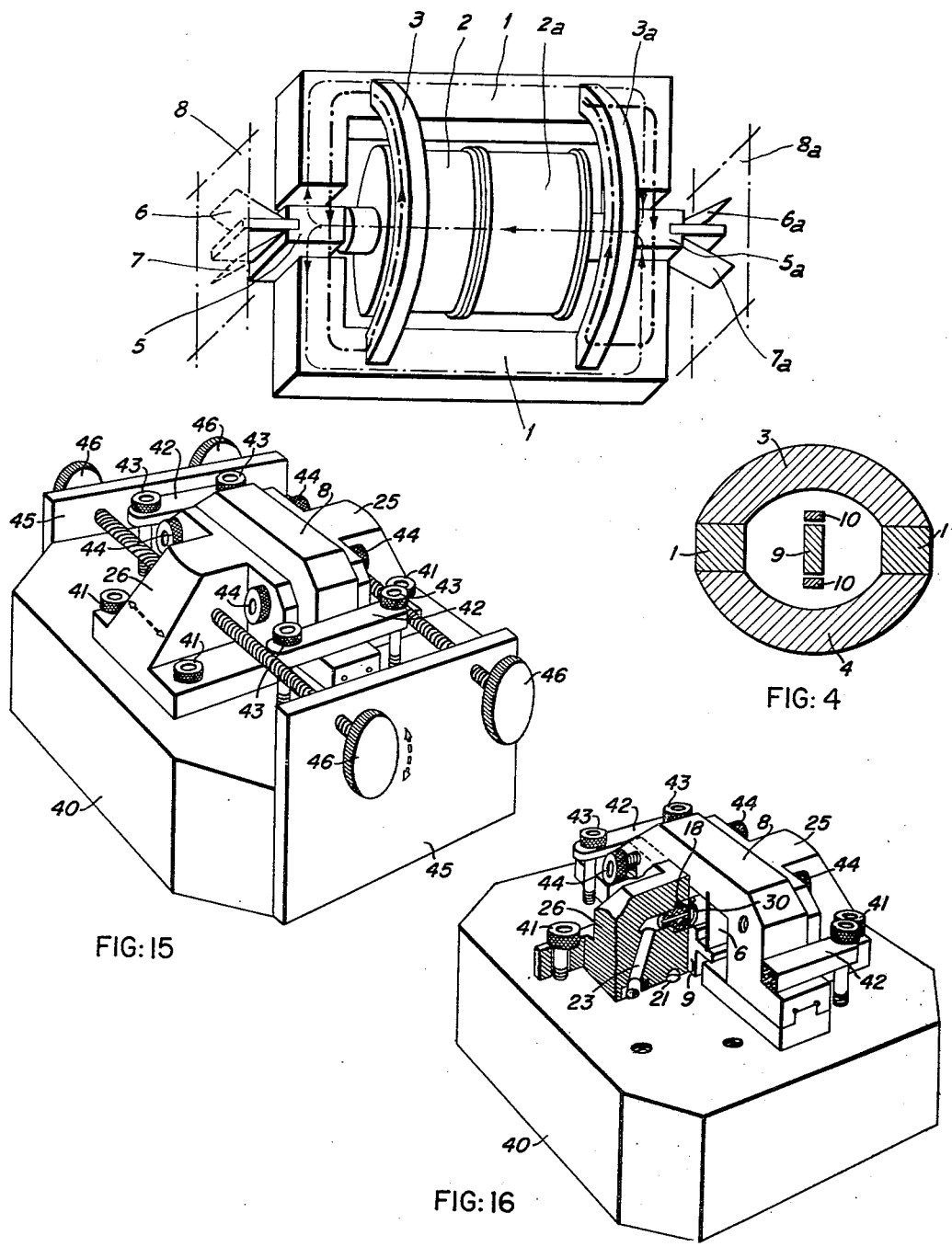

Nov. 6, 1962   R. LUCIEN   3,062,235
HYDRAULIC SERVO-MOTOR DISTRIBUTOR
Filed March 24, 1959   5 Sheets-Sheet 3
FIG:5
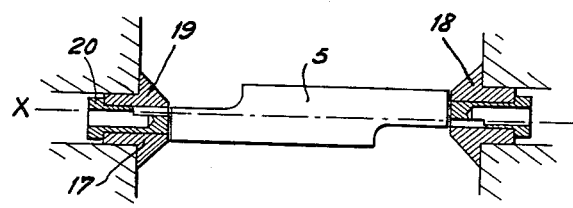
FIG:6
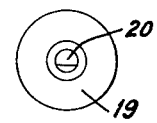
FIG:7
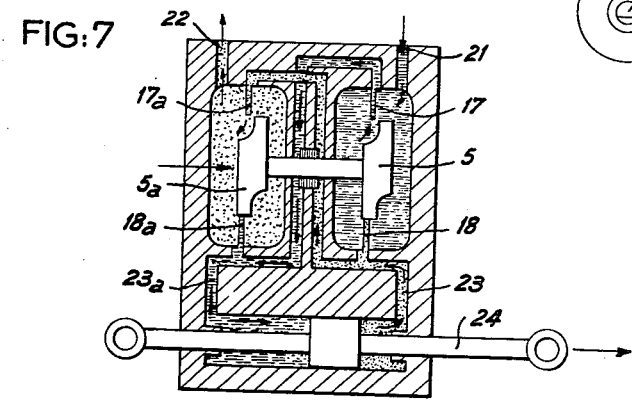
FIG:8
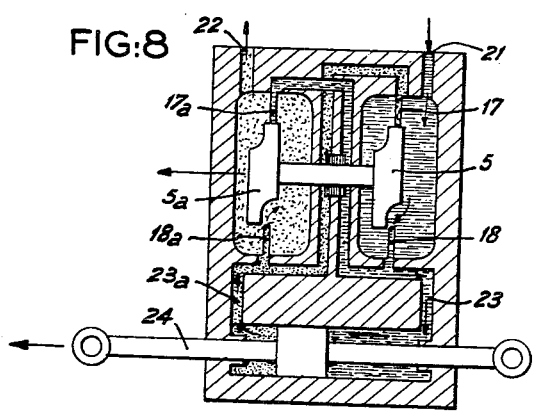

Nov. 6, 1962

R. LUCIEN 3,062,235

HYDRAULIC SERVO-MOTOR DISTRIBUTOR

Filed March 24, 1959

Nov. 6, 1962  R. LUCIEN  3,062,235
HYDRAULIC SERVO-MOTOR DISTRIBUTOR
Filed March 24, 1959  5 Sheets-Sheet 5
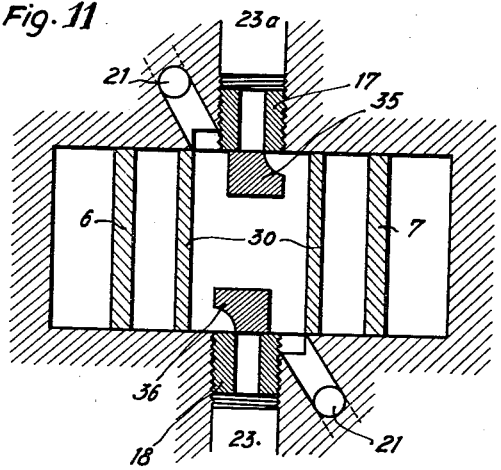
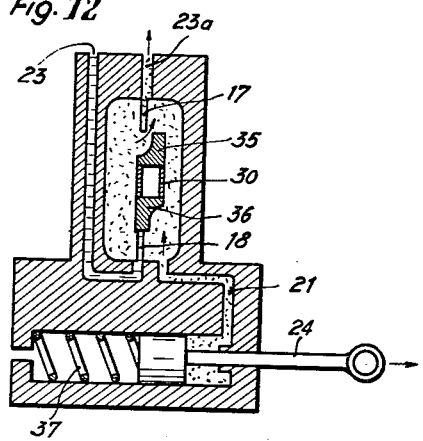
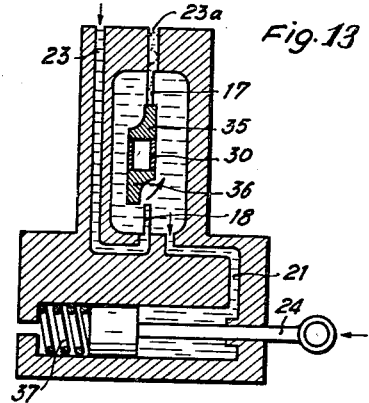
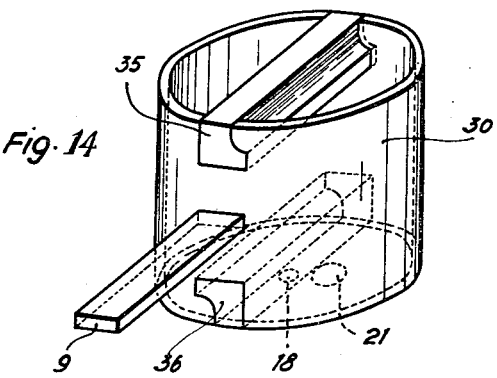

United States Patent Office 3,062,235
Patented Nov. 6, 1962

3,062,235
HYDRAULIC SERVO-MOTOR DISTRIBUTOR
René Lucien, Neuilly-sur-Seine, France, assignor to Société à responsabilite limitee: Recherches Etudes Production R.E.P., a corporation of France
Filed Mar. 24, 1959, Ser. No. 801,568
Claims priority, application France Mar. 25, 1958
2 Claims. (Cl. 137—623)

The present invention relates to distributors for supplying hydraulic servo-motors.

In these distributors it is desirable to obtain a flow of fluid without any delay, that is to say a flow which starts at the moment when the associated control unit leaves its zero position. For example, if this control is electric, as soon as current is conveyed to the control coils, it is endeavored to obtained a flow of fluid.

It is further desirable to obtain a flow of fluid which is approximately proportional to the intensity of control current, and that the flow be obtained for small values of control current.

These high-performance results are obtained in accordance with known methods by permitting large hydraulic losses in the distributor, such losses being occasionally even systematic. At least one well known system is based on the difference between the systematic leakage of two nozzles. Continuous internal leakage of this kind is permissible when the power employed is sufficiently large to necessitate a pump for the supply of fluid under pressure; but it is nevertheless desirable that the said leakage remains small compared with the useful rate of flow. On the other hand when the power employed is sufficiently small to allow the use of an accumulator to be considered for its operation, this operation will only be practicable if the internal leakage is sufficiently small.

The present invention proposes a distributor which provides excellent performance, while reducing the said internal leakage to a minimum. The said distributor comprises a motor of known type manufactured industrially in several countries. In accordance with the present invention, the said motor drives one or two pivotally mounted shutters and each shutter co-operates with two special nozzles.

The invention will be described below with reference to the following figures which are given by way of example and not by way of implied limitation:

FIG. 1 shows apparatus illustrating the principle of a torque-motor of known type;

FIGS. 2 and 3 are respective views of the distributor of the invention with two shutters, in elevation and in plan;

FIG. 4 is a partial cross-section taken along line A—A of FIG. 2;

FIG. 5 is a view on enlarged scale of a shutter and of two nozzles co-operating with said shutter;

FIGURE 6 is an end-view of a nozzle, on the scale of FIG. 5;

FIGS. 7 and 8 are explanatory figures describing the operation of the distributor, with two shutters driving a hydraulic servo-motor;

FIG. 11 is a partial cross-section at right angles to the view of FIG. 10;

FIGS. 12 and 13 are explanatory figures which describe the operation of the distributor with one shutter driving a hydraulic jack;

FIG. 14 is a view in perspective of the shutters.

FIG. 15 is a perspective view showing the provisional mounting for the adjustment of the supports 25 and 26;

FIGURE 16 is a perspective view with partial sections showing more clearly the arrangement of the members.

Figure 9:
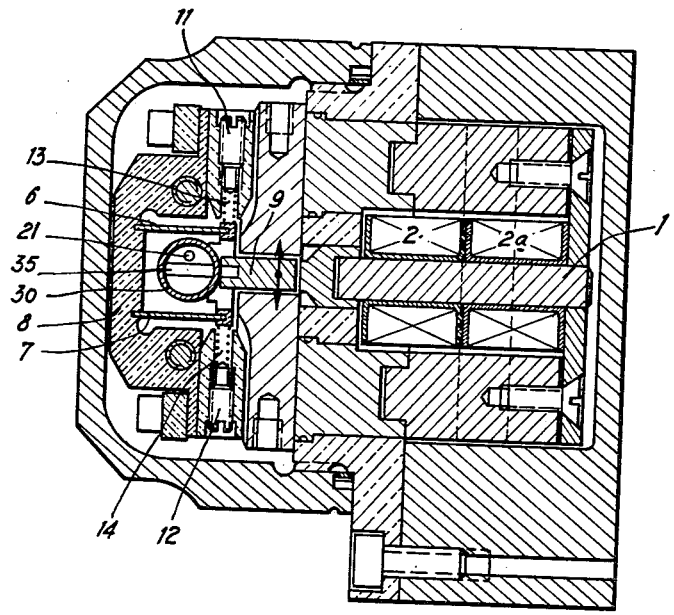
FIG. 9 is a view in elevation of the distributor with one shutter.

The torque-motor employed in the illustrated embodiment of this invention may be of a known type and its principle will next be briefly summarized, reference being made to FIG. 1. The said torque-motor comprises essentially an electro-magnetic circuit 1 excited by two coils 2 and 2a, polarized by four permanent magnets, only two of which can be seen in the figure at 3 and 3a (the two others 4 and 4a are placed symmetrically beneath the plan of the figure, the poles placed opposite each other having the same polarity). This electro-magnetic circuit is interrupted by two symmetrical air-gaps, in each of which is housed a shutter 5 and 5a of magnetic metal. Each shutter is mounted on two blades, blades 6 and 7 for the shutter 5 and blades 6a and 7a for the shutter 5a. The side of each blade, opposite to the shutter, is rigidly fixed to an end-plate 8 or 8a represented diagrammatically by a rectangle in dotted line.

In the course of operation, the electro-magnetic fluxes produced by the coils 2 and 2a are added algebraically (in accordance with the relative direction of the currents in these coils). In the air-gap of each shutter, the total electro-magnetic flux is shown by arrows in thin dotted lines and is combined with the permanent flux which is shown by arrows and a thick dotted line, this combination being an addition for one side of the shutter and a subtraction for the other side of the same shutter; the resulting force causes the shutter 5 to rotate slightly about an axis located in the vicinity of the intersection of the planes of the two blades 6 and 7 which bend elastically. It is clear that the rotation of the shutter 5a is equal to that of the shutter 5 for the same forces.

FIGS. 2 and 3 are views in elevation and in plan of the distributor. The torque-motor appears again in these figures, the same units being referenced in identical manner. The mounting of the coils 2 and 2a in a fluid-tight chamber facilitates on the one hand the entry of the electric wires by avoiding the need for a corresponding fluid-tight outlet, and on the other hand enables a hydraulic fluid to be employed which is incompatible with the wire insulators. This assembly makes it also possible to fill the chamber of the coils with any liquid, compound or the like.

FIG. 4 is a partial cross-section taken along the line A—A of FIG. 2. The extremity 9 of the shutter 5 moves in the notch formed by the extremity 10 of the core of the magnetic circuit 1. Two screws 11 and 12 (FIG. 3) acting upon two springs 13 and 14 of magnetic metal enable the position of the shutter 5 to be adjusted in a precise manner. A membrane or diaphragm 15 prevents the fluid from flowing in the vicinity of the magnetic circuits which tend to collect ferrous dust. The balance of pressure on the two sides of the diaphragm 15 is effected by means of a small channel with a filter 16. The shutter 5 co-operates with two nozzles 17 and 18. All that has been described above also applies to the shutter 5a, the corresponding members having the same references, to which is attached the suffix a.

FIG. 5 shows on enlarged scale, the shutter 5 and the nozzles 17 and 18. The shutter 5 is pivotally mounted about an imaginary axis XX resulting from the elastic bending of the spring blades 6 and 7 (see FIG. 1) and located to the rear of the plane of the figure. The rotation of shutter 5 being of small angular value, the apparent displacement of the shutter 5 in FIG. 5 is substantially an up and down movement in the illustration which, according to its direction, uncovers one or the other of the nozzles 17 and 18. Movement of the shutters is controlled by the electro-magnetic effect of the magnetic circuit as controlled by coils 2 and 2a. Each nozzle in accordance with FIGS. 5 and 6 consists of a base 19 and a counter-member 20 machined to the shape shown in FIG. 5 and in which is formed an opening, for example, in the shape of a segment of a circle, visible in FIG. 6. The shaping of the resulting jets in the form of circular segments facilitates the definition of zero because the displacement around zero corresponds to very small openings of the nozzle.

Thus the area of the opening is not proportional to the movement of the shutter for openings of circular segments. Consequently, for movement of the shutter near zero, the exposed area is very small. Accordingly, for small errors near the zero position of the shutter, only a small area for leakage is presented. This is to be contrasted with a rectangular opening wherein the opening is proportional to movement of the shutter and wherein for small errors of the shutter near zero much greater openings are presented as compared to the openings for the same error of a circular segment.

Referring again to FIG. 2, the arrival of the fluid under pressure takes place directly through the opening 21 into the shutter chamber adjacent shutter 5, the return of the fluid to the collector tank taking place directly through the opening 22 from the shutter chamber adjacent shutter 5a. The nozzles 18 and 17a are connected together and also to a first utilization orifice 23. In the same manner, the nozzles 17 and 18a are connected together and also to a second utilization orifice 23a.

The operation will next be described below, reference being made to the explanatory FIGURES 7 and 8, in which the distributor is represented diagrammatically and coupled, as shown, to a hydraulic servo-motor. In FIG. 7, the shutters 5 and 5a have been moved by the distributor towards the right, thus uncovering the nozzles 17 and 17a. The nozzle 17 supplies the channel 23a under pressure and the nozzle 17a evacuates the channel 23 to the collector-tank. The piston 24 of the servo-motor is thus moved towards the right. In FIG. 8, the movements are reversed. The shutters 5 and 5a have been displaced towards the left. The nozzle 18 supplies the channel 23 under pressure and the nozzle 18a evacuates the channel 23a to the collector-tank. The piston 24 of the servo-motor is moved towards the left.

Each nozzle 17 or 18 is mounted on a support 25 or 26 (FIG. 2). Each support is adjusted on assembly by means of screws, so as to insure the exact correspondence of position of the edge of the shutter and the edge of the nozzle. FIGURES 15 and 16 show the members described in FIG. 2. The same reference numerals are employed for like elements. In addition, the supports 25 or 26 are mounted on the plate 40 by means of the screws 41. The plate 8 is mounted on the plate 40 by means of stay bolts 42 and screws 43. The supports 25 or 26 are connected to the plate 8 by the screws 44 and the mounting for the adjustment comprises two plates 45 and positioning screws 46.

The suspension of each shutter 5 (or 5a) on two blades 6 and 7 (or 6a and 7a) in the manner which has been described forms a unit having extremely high transverse rigidity. It follows from this that the extent of play may be extremely small without risk of actual contact between the shutter and nozzle. This play may, for example, be obtained by close grinding of the seatings followed by polishing or electrolytic treatment. The extreme reduction of play further contributes to the reduction of leakage. This absence of leakage also contributes to the sensitivity of the system.

The use of nozzles 17, 17a, 18 and 18a having a special shape (FIG. 6) also assists in reducing leakage; in addition the nozzles when they do not eject fluid are substantially covered by shutters 5 and 5a, thus further reducing their leakage. The special shape of the nozzles is deliberate with a view to reducing the leakages; for this purpose, the orifice of the nozzles is designed in such a manner that its perimeter is as small as possible—while complying with the other constructional requirements— which effectively reduces the leakages to a minimum. Finally the small value of the transverse hydraulic reactions with respect to the high rigidity of suspension of the shutter in the transverse direction prevents increased leakage due to transverse deformation. Each nozzle exerts on the shutter a force equal to the product of the pressure through the section of the nozzle. In the median position of the shutter, the forces exerted by the two nozzles on the shutter cancel each other, but when the shutter is displaced, an hydraulic force remains, which will be the more reduced, the smaller the section of the nozzles.

In accordance with a further arrangement provided by the present invention, the motor of the distributor only actuates a single shutter co-operating with two nozzles. This unit provides a shingle-acting control, for example the control of a jack, one face of the piston of said jack being alternately put under pressure and evacuated by the distributor.

The advantages of this arrangement are the simplification of the distributor, which comprises one-half the number of delicate parts, the reduction of leakage to one-half of its value and the elimination of the balancing adjustment between the two shutters, when this balancing action is necessary for the double action.

A further arrangement in accordance with the present invention, and which may be applied separately or simultaneously with the preceding arrangement, eliminates the diaphragm which isolates the shutter chamber from the general cavity and replaces the diaphragm by a hollow member rigidly fixed mechanically to the shutter and moveable with said shutter. The hollow member is substantially fluid-tight with respect to the shutter chamber and into the cavity of the hollow member issues, on the one hand, a channel permanently connected with said cavity and, on the other hand, the nozzle or nozzles when they are uncovered by the shutter. This hollow member is preferably tubular.

The advantages of this arrangement are the elimination of the diaphragm, which is a fragile member liable to cause undesirable mechanical reactions, and the free choice of the axis of rotation of the shutter. Moreover, the two suspension blades may be mounted parallel to each other in such manner as to obtain a movement of translation of the shutter relative to the nozzles and may also be mounted in such manner that their planes intersect in the vicinity of the center of gravity of the moveable system in such manner as to improve its behavior under substantial vibrations and very high accelerations. A further advantage of this second improvement is to facilitate the draining of the device which may be carried out without the precautions required to safeguard the diaphragm. A final advantage is that the hollow member may be assembled with a play of a few microns with respect to the walls of the shutter chamber, and while this does not insure fluid-tightness under slow variations of pressure, a sufficient degree of fluid-tightness is insured under rapid variations of pressure thus producing a substantial reduction of the volume of oil under variable pressure and an improvement in the time-constant due to the reduction of elasticity.

Figure 10:
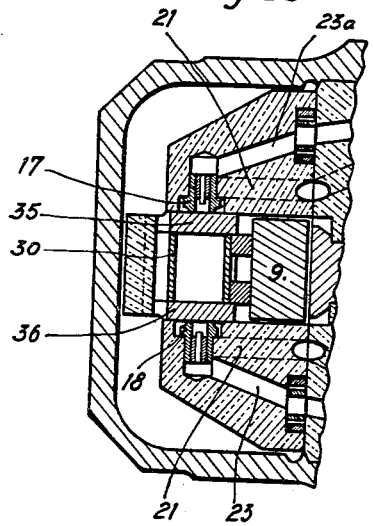
FIG. 10 is a partial cross-section at right angles to the view of FIG. 9.

The two above arrangements will be described together, reference being made to FIGS. 9, 10 and 11 given by way of example and not by way of implied limitation.

With the same references as before, the torque-motor essentially comprises a polarized electro-magnetic circuit 1, excited by two coils 2 and 2a, acting upon a magnetic plate 9, mounted on two flexible blades 6 and 7 rigidly fixed in an end-plate 8. To the plate 9 is fixed a tube 30 which bridges the two members 35 and 36 forming the shutter. Each of these members 35 and 36 thus moves in front of a nozzle 17 and 18 connected to a channel 23 and 23a. The interior of the tube 30 is placed opposite the openings 21 of a channel to which it is thus permanently connected.

The operation of the torque-motor, of the shutters and the nozzles remains as previously described, but in this case is intended to obtain a single-acting effect which will be described below, reference being made to the explanatory FIGURES 12 and 13 in which the distributor is represented diagrammatically and is coupled, as shown, to a hydraulic jack.

In FIG. 12, the shutters 35 and 36 have been displaced towards the right thus uncovering the nozzle 17 thereby putting the jack into communication with the evacuation 23a. The restoring spring 37 then returns the piston 24 towards the right. In FIG. 13, the shutters 35 and 36 have been displaced towards the left thus uncovering the nozzle 18, which puts the jack into communication with the supply under pressure 23. The piston 24 is actuated towards the left by the fluid under pressure thus compressing the restoring spring 37.

What I claim is:

1. A hydraulic servo-motor distributor comprising a torque-motor, a shutter actuated by said motor, two suspension blades supporting said shutter, two nozzles operatively associated with and selectively covered by said shutter, means supporting said nozzles such that the position of each nozzle is adjustable with respect to the shutter, a hollow member rigidly fixed to the shutter and housing the same, means defining a channel opening into the said hollow member, on the one hand, the nozzles on the other hand, opening into said hollow member when uncovered by the shutter.

2. A distributor in accordance with claim 1, in which the suspension blades are in parallel relation.

References Cited in the file of this patent

UNITED STATES PATENTS

| | | |
|---|---|---|
| 2,601,867 | Alyes | July 1, 1952 |
| 2,729,751 | Westman | July 3, 1956 |
| 2,827,067 | Healy | Mar. 18, 1958 |

FOREIGN PATENTS

| | | |
|---|---|---|
| 689,814 | France | June 2, 1930 |
| 931,747 | Germany | July 8, 1949 |